United States Patent [19]
Kitahashi et al.

[11] Patent Number: 4,767,212
[45] Date of Patent: Aug. 30, 1988

[54] VOLUME DETERMINATION PROCESS

[75] Inventors: Tadahiro Kitahashi; Osami Saito, both of Toyohashi; Tadaaki Matsuno, Shiga; Yoshihiro Nakamura, Kusatsu, all of Japan

[73] Assignee: Ishida Scales Mfg. Co., Ltd., Kyoto, Japan

[21] Appl. No.: 120,170

[22] Filed: Nov. 12, 1987

Related U.S. Application Data

[63] Continuation of Ser. No. 14,212, Feb. 5, 1987, abandoned, which is a continuation of Ser. No. 777,732, Sep. 19, 1985, abandoned.

[30] Foreign Application Priority Data

| Sep. 19, 1984 | [JP] | Japan | 59-194782 |
| Sep. 19, 1984 | [JP] | Japan | 59-194783 |
| Oct. 12, 1984 | [JP] | Japan | 59-213372 |
| Nov. 9, 1984 | [JP] | Japan | 59-236455 |
| Nov. 9, 1984 | [JP] | Japan | 59-236456 |
| Nov. 9, 1984 | [JP] | Japan | 59-236457 |
| Nov. 9, 1984 | [JP] | Japan | 59-236458 |
| Nov. 9, 1984 | [JP] | Japan | 59-236459 |
| Nov. 9, 1984 | [JP] | Japan | 59-236460 |
| Nov. 9, 1984 | [JP] | Japan | 59-236461 |

[51] Int. Cl.$^4$ .................................... G01B 11/00
[52] U.S. Cl. .................... 356/379; 358/106; 358/107
[58] Field of Search .............. 356/371, 375, 376, 379, 356/380, 237; 358/96, 101, 106, 107

[56] References Cited

U.S. PATENT DOCUMENTS

| 4,417,817 | 11/1983 | Böhme et al. | 356/380 |
| 4,535,782 | 8/1985 | Zoltan | 128/665 |

FOREIGN PATENT DOCUMENTS 3120193 3/1982 Fed. Rep. of Germany.
1480022 7/1977 United Kingdom.

OTHER PUBLICATIONS

Hammond et al., *IBM Technical Disclosure Bulletin*, vol. 14, No. 1, Jun. 1971, pp. 49 and 50.
Hopper et al., *IBM Technical Disclosure Bulletin*, vol. 25, No. 9, Feb. 1983, pp. 4821 and 4822.
European Search Report, completed 12/20/85 by Examiner Burghardt at Vienna.

*Primary Examiner*—F. L. Evans
*Attorney, Agent, or Firm*—Staas & Halsey

[57] ABSTRACT

In a volume determination process, a slit pattern is projected obliquely downwardly, or slit patterns are projected obliquely downwardly and upwardly, onto an article which is at rest or in motion. The slit pattern or patterns are in the form of a parallel stripe pattern or a grid pattern. The surface or surfaces onto which the slit pattern or patterns are projected are imaged by a television camera, and the heights of slit positions on the article are computed on the basis of the image or images picked up by the television camera. The volume of the article is computed on the basis of the computed heights of the slit positions. The weight of the article can be derived by multiplying the volume by the specific gravity of the article. It is determined whether there is a surface flaw or not by determining whether differentials of the slit pattern or patterns are discrete or not.

12 Claims, 17 Drawing Sheets

Fig. 3
Slit Pattern
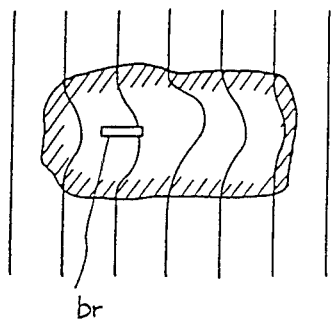
br
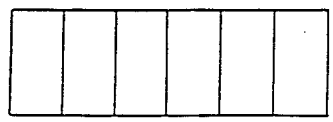
Slit Pattern

Fig. 4 (a)
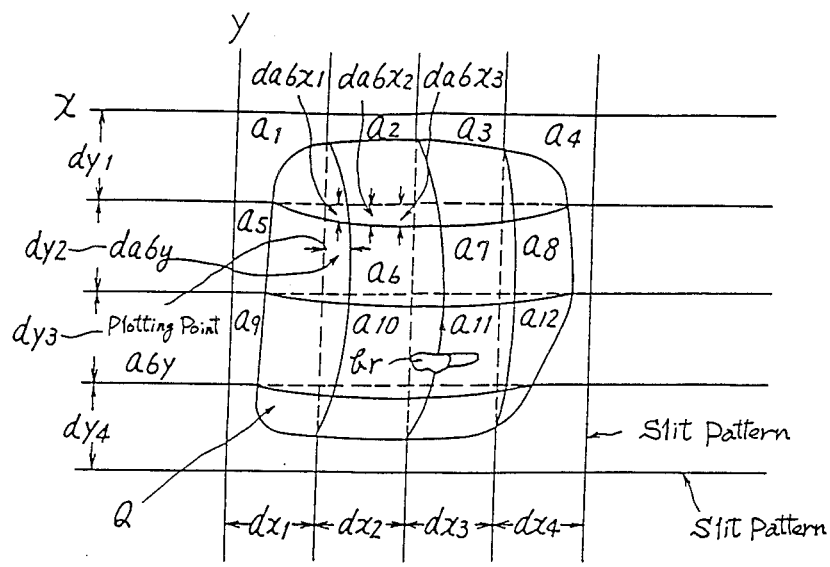
Fig. 4 (b)
Fig. 4 (c)
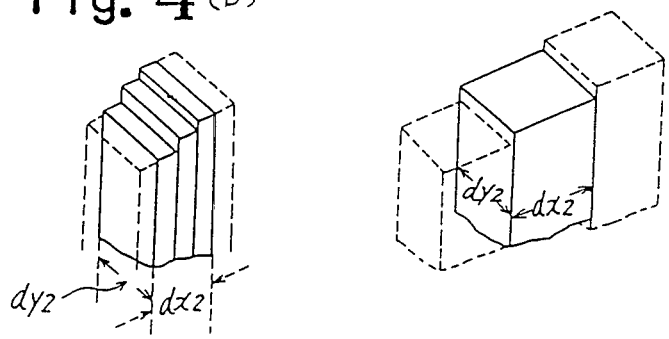

Fig. 6
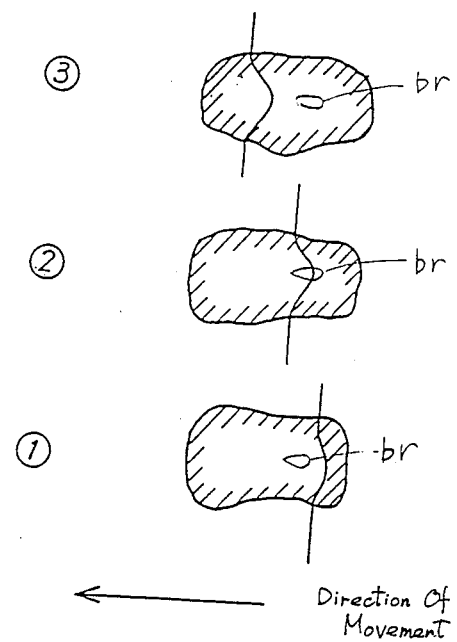
← Direction Of Movement
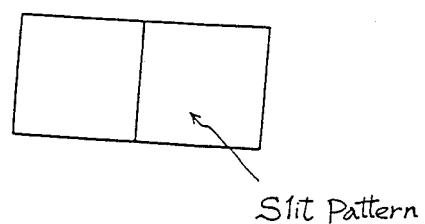
Slit Pattern

Fig.11 (a)
Fig.11 (b)
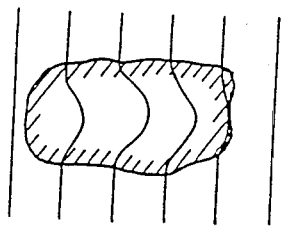
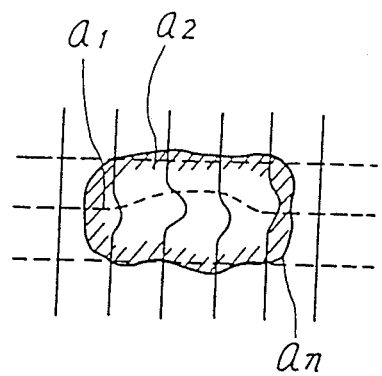
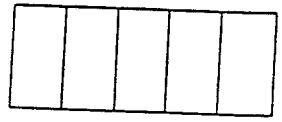
Slit Pattern
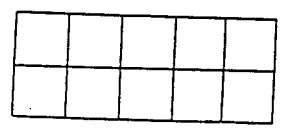

Fig. 12 (a)
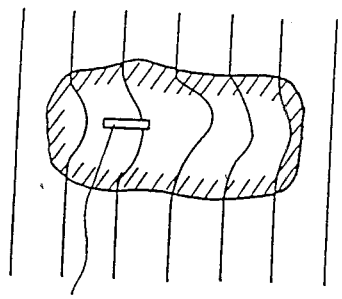
Flaw br1
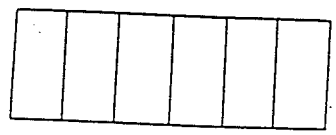
Slit Pattern
Fig. 12 (b)
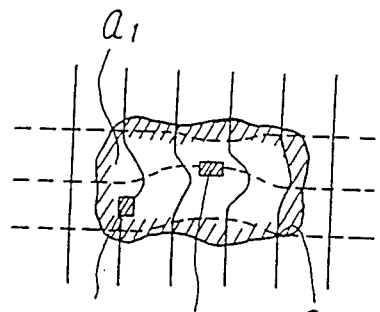
Flaw   Flaw
br1    br2
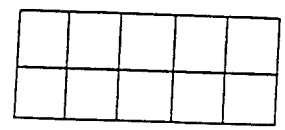
Slit Pattern Fig. 13
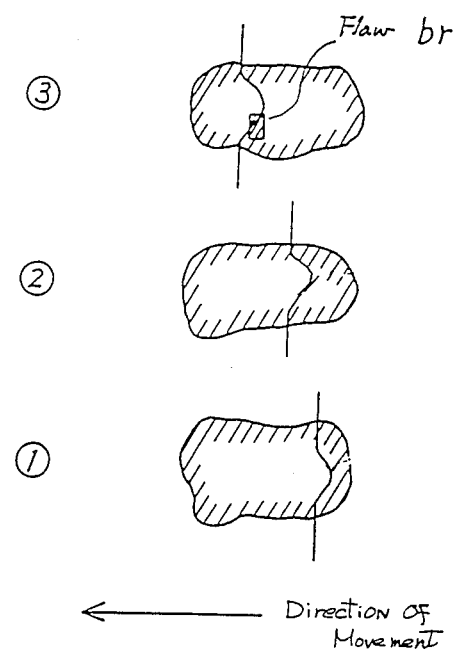
← Direction of Movement
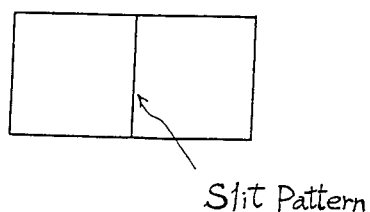
Slit Pattern

VOLUME DETERMINATION PROCESS

This is a continuation of co-pending application Ser. No. 14,212 filed on Feb. 5, 1987, now abandoned which is a continuation of Ser. No. Sept. 19, 1985 now abandoned.

BACKGROUND OF THE INVENTION

The present invention relates to a volume determination process for determining the weight of an article such as a vegetable or a fruit in a non-contact manner without using a weight sensor.

The weight of an article is generally detected by a weight sensor. However, where the weight of a vegitable or other articles having an irregular surface is to be measured, it is desirable to measure the weight in a noncontact manner without using the weight sensor. There has not been developed any weight determination process which would meet such a demand.

Surface defects of an articles have heretofore been visually checked. The problems of such visual checking are that the efficiency varies from individual to individual, some defects may not be found due to an oversight, and defective articles may be shipped.

SUMMARY OF THE INVENTION

It is an object of the present invention to provide a volume determination process for determining the volume of an article by projecting a slit pattern obliquely downwardly onto the article and computing the heights of slit positions on the article based on the curvatures of the projected slits on the article.

Another object of the present invention is to provide a volume determination process of the aforesaid type employing a parallel stripe pattern or a grid pattern as the slit pattern.

Still another object of the present invention is to provide a volume determination process of the aforesaid type capable of detecting whether there is a flaw on the surface of the article by finding the differential of the slit pattern projected onto the article.

A still further object of the present invention is to provide a volume determination process of the aforesaid type for determining the volume and weight of the article by projecting the slit pattern onto the article while moving the article.

A yet still further object of the present invention is to provide a volume determination process capable of determining the volume and weight of an article by projecting slit patterns obliquely downwardly and upwardly onto the article and computing the heights of slit positions on the article based on the curvatures of the projected slits on the article.

Another object of the present invention is to provide a volume determination process of the aforesaid type employing parallel stripe patterns or grid patterns as the slit patterns.

Still another object of the present invention is to provide a volume determination process of the aforesaid type capable of detecting whether there is a flaw on the surface of the article by finding the differentials of the slit patterns projected onto the article.

A still further object of the present invention is to provide a volume determination process of the aforesaid type for determining the volume and weight of the article by projecting the slit patterns onto the article while moving the article.

According to the present invention, a slit pattern is projected obliquely downwardly onto an article, and the surface of the article on which the slit pattern is projected is imaged by a television camera. The image produced by the television camera is employed to compute the heights of slit positions on the article, and the volume of the article is found on the basis of the computed heights. The volume is then multiplied by the apparent specific gravity of the article to determine the volume of the article.

Further according to the present invention, slit patterns are projected obliquely downwardly and upwardly onto an article, and the surfaces of the article on which the slit patterns are projected are imaged by a television camera through reflecting mirrors positioned above and below the article. The image produced by the television camera is employed to compute the heights of slit positions on the article, and the volume of the article is found on the basis of the computed heights. The volume is then multiplied by the apparent specific gravity of the article to determine the volume of the article.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a diagram explanatory of an embodiment of the present invention;

FIGS. 4a, 4b, and 4c are diagrams explanatory of another embodiment of the present invention;

FIG. 6 is a diagram explanatory of another embodiment of the present invention;

FIGS. 11a and 11b are diagrams explanatory of still another embodiment of the present invention;

FIGS. 12a and 12b are diagrams explanatory of a still further embodiment of the present invention;

FIG. 13 is a diagram explanatory of a yet still further embodiment of the present invention.

DESCRIPTION OF THE PREFERRED EMBODIMENTS

Volume determination processes according to the present invention can roughly be classified into two groups. In one group, a slit pattern is projected obliquely downwardly onto an article to be measured. In the other class, slit patterns are projected obliquely downwardly and upwardly onto an article to be measured. The volume determination process in the former group will first be described with reference to FIGS. 1 through 9, and then the volume determination process in the latter group will be described with reference to FIGS. 10 through 17.

Figs. 1a and 1b are explanatory of the principles of a volume determination process according to the present invention. As shown in FIG. 1a, a television camera D is positioned above an article Q to be measured which is placed on a support plate DE. A slit projector C composed of a projector P and a slit plate S is positioned such that the axis of the slit projector C along which a slit pattern is projected by the slit projector C extends at an angle $\theta$ to the optical axis Z of the television camera D. When a pattern of slits is projected by the slit projector C onto the article Q, one slit position is deviated d from the optical axis Z when viewed from the television camera D. By finding the deviation d (deformed slit pattern), the thickness (height) h of the article at the slit position can be expressed by the following expression:

$$h = d \tan(\# - \theta) \quad (1)$$

Therefore, by finding the heights of the respective slits from slit deviations $d_1$-$d_4$ (FIG. 1b), , an approximate volume of the article can be computed on the basis of the heights determined from the upper surface of the article Q. The weight of the article can be determined by multiplying the volume of the article by the apparent specific gravity thereof without using any weight sensor.

Figure 2:
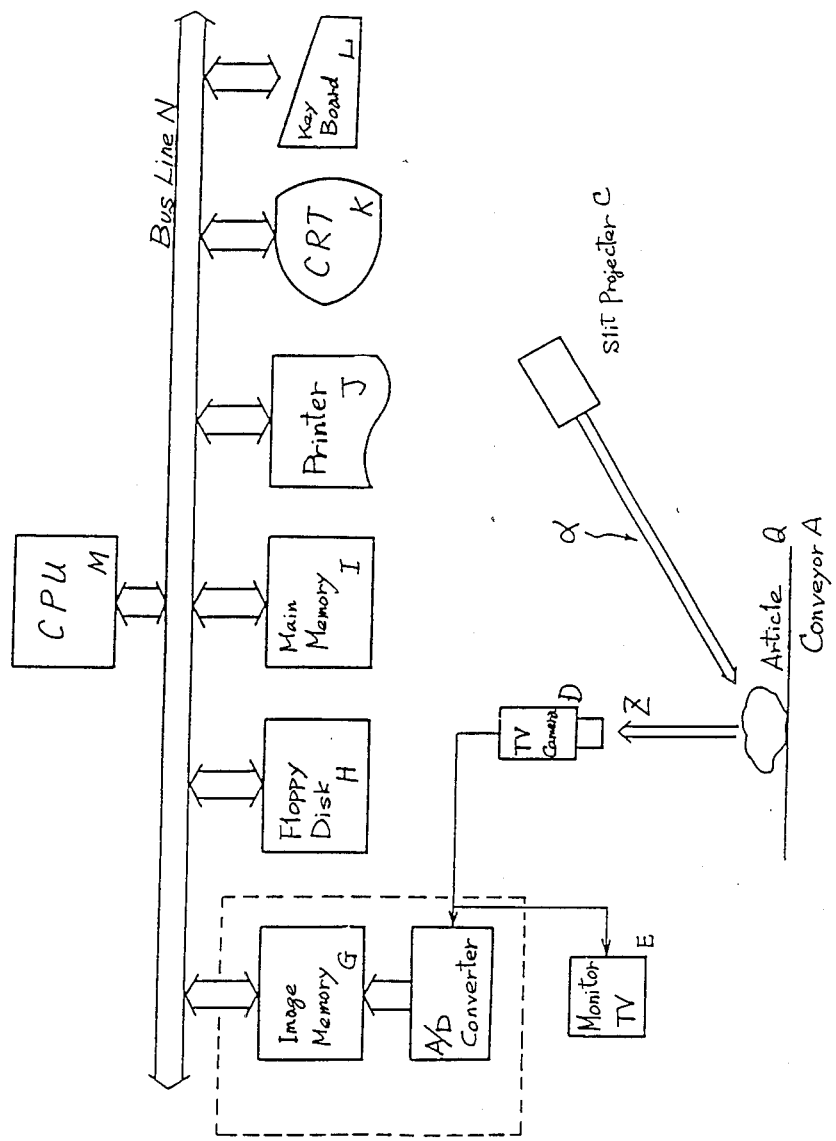
FIG. 2 is a block diagram of a system for carrying out a process of the present invention.

FIG. 2 shows in block form a system for determining the weight of an article according to the present invention. The slit projector C is positioned obliquely upwardly of the article Q placed on a conveyor A. The slit pattern projected onto the article Q is imaged or detected by the television camera D disposed directly over the article Q. The image of the slit pattern is supplied from the television camera D to an A/D converter F and a monitor television receiver E. The A/D converter F converts the image into 256×256 8-bit pixels which are then stored in an image memory G. The image memory G is connected by a bus N to a floppy disk H, a main memory I, a printer J, a cathode-ray tube (CRT) K, a keyboard L, and a central processing unit (CPU) M. The CPU M executes the cycle of operation indicated by the flowchart of FIG. 5 for determining the weight of the article Q.

FIG. 3 shows a slit pattern in the form of a parallel stripe pattern (FIG. 1b) projected obliquely downwardly onto the article Q and a slit pattern as it is curved on the article Q.

Figure 5:
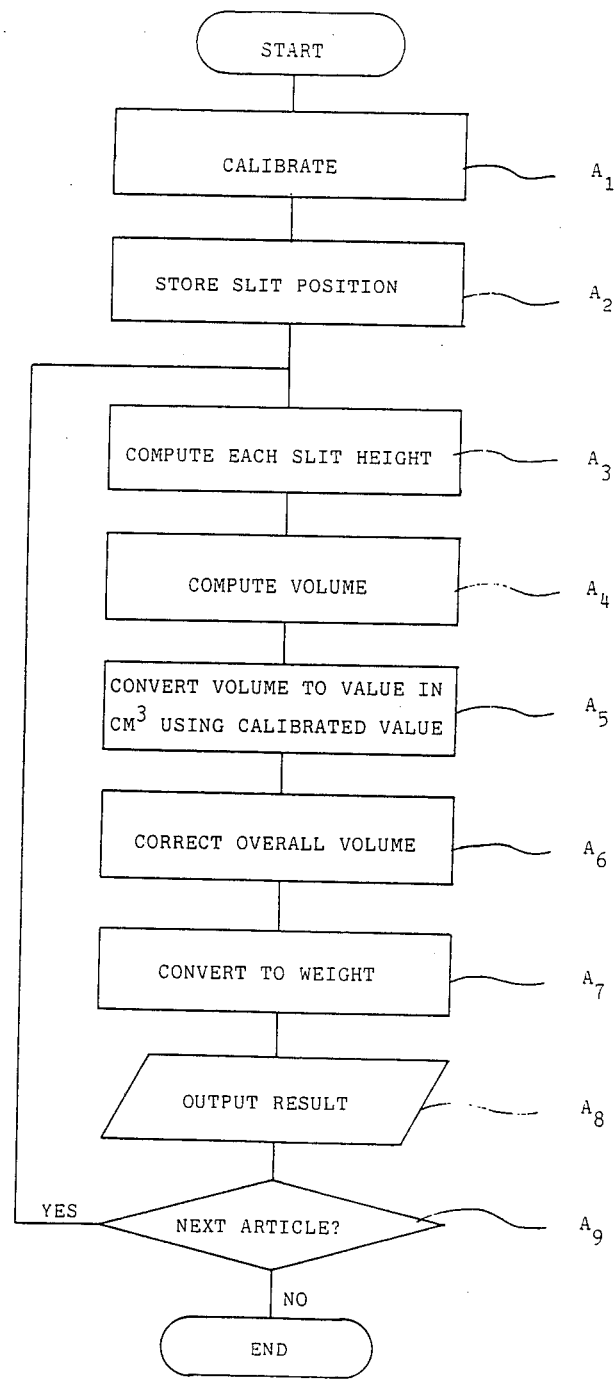
FIG. 5 is a flowchart of an embodiment of the present invention.

The flowchart of FIG. 5 shows the steps of a process of the present invention, and will be described below.

(1) The image produced by the television camera of the slit pattern projected onto the article is of a size that can be determined only in terms of the pixels. Therefore, the size of the article in the real space is required to be subject to unit calibration. A step A1 effects such unit calibration to find a value in centimeter corresponding to the pixel value. For example, a white sheet of paper having a diameter of A cm is imaged by the television camera, and the pixel value corresponding to the image which is A cm across is determined to compute the number of pixels in an area B cm². The result is used for conversion of the article into the unit cm³ in a step A5. (As an example, A=8 cm and B=512 cm³.)

(2) The original slit positions are stored as reference points for determining the heights of the slits on the article in a step A2.

(3) The deviations (deformed slit pattern) of the slits projected onto the article are measured, and the heights of the slits at positions where they are projected onto the article are computed according to the equation (1) in a step A3. The height of the article between two adjacent projected slits is regarded as remaining the same.

(4) The surface of the article where the slits are projected is imaged by the television camera to produce an image in terms of pixels. The volume of the upper half of the article is determined as the sum of the heights of the respective pixel positions in a step A4. In other words, the volume is found as the integral of pixel widths.

(5) Since the volume obtained from the image is defined by the pixels, it is then converted into the value in cm³ in the real space in a step A5, using the calibrated values found in the step A1. For example, the volume found in terms of pixels in the step A4 is divided by the number of pixels corresponding to 512 cm³, and the result is multiplied by 512 to get the volume in cm³.

(6) The slit pattern is projected only downwardly onto the article. The shape of the lower half of the article is regarded as being the same as that of the upper half of the article. The overall volume of the article is corrected on the basis of this assumption in a step A6.

(7) The overall volume is multiplied by the apparent specific gravity of the article to find the weight in a step A7.

(8) The determined weight is output to the CRT K and/or the printer J in a step A8.

(9) A step A9 determines whether there is a next article to be processed or not. If there is a next article, then the steps A3 through A8 are repeated.

In the foregoing first embodiment, the parallel stripe pattern is used as the slit pattern. A second embodiment in which a grid pattern is employed as the slit pattern will be described with reference to FIGS. 4a, 4b, and 4c, in which the slit plate S in FIG. 1a is replaced with a grid plate.

FIG. 4a shows the manner in which a grid slit pattern projected obliquely downwardly onto the article at an angle $\theta$ to the axis Z is curved on the article. Now, attention should be directed to an area a6, for example, among areas a1 through a10 defined by intersecting vertical and horizontal slits. If the plotting point on a vertical slit is a6y, then the deviation of the vertical slit is da6y. The height ha6y of a prism having its bottom as the area a6 obtained from the information arising from the deviation of the vertical slit is given by:

$$ha6y = da6y \cdot \tan(\# - \theta) \quad (2)$$

The prism height ha6y is subject to a large error since only the height of the plotting point is considered (according to the process of the first embodiment). In the second embodiment, therefore, the height of the prism having, its bottom as the area a6 is found considering the inclination, in the direction of Y, of the area a6 obtained from the information arising from the deviation of the vertical slit.

According to the second embodiment, more specifically, three plotting points a6x1, a6x2, a6x3, for example, are assumed on a horizontal slit, and the deviations of these plotting points are da6x1, da6x2, da6x3, respectively. The heights at these plotting points are expressed by:

$$ha6x1 = da6x1 \tan(\# - \theta) \quad (3)$$

$$ha6x2 = da6x2 \tan(\# - \theta) \quad (4)$$

$$ha6x3 = da6x3 \tan(\# - \theta) \quad (5)$$

Figure 1:
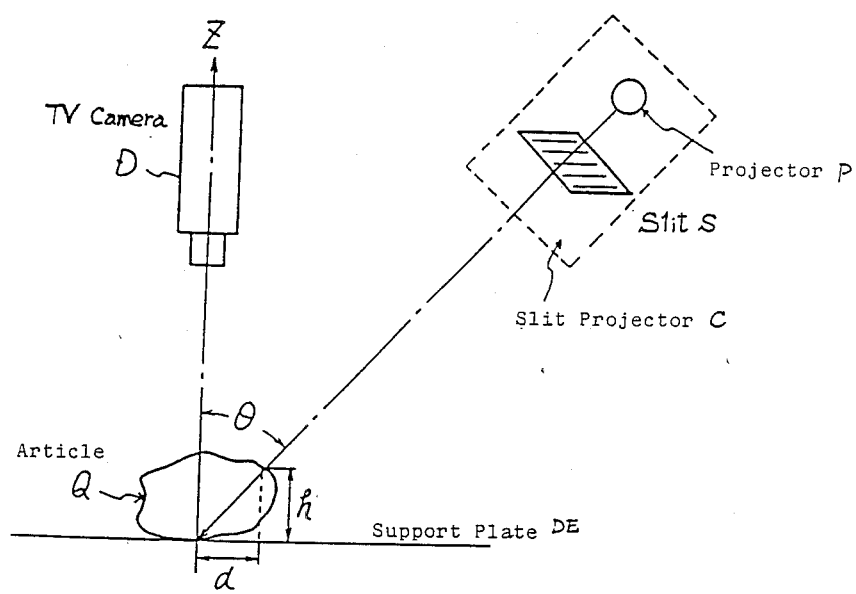
FIGS. 1a and 1b are diagrams explanatory of the principles of the present invention.
Figure 1:
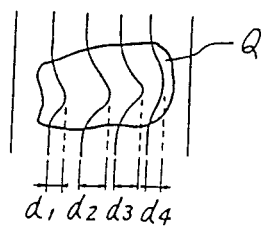

The volume model produced in consideration of the height information derived from the information of these plotting points is illustrated in FIG. 4b. By determining the volume from the deviations of the vertical and horizontal slits, the weight of the article can be found more accurately than by projecting only parallel slits onto the article as shown in FIG. 1 and determining the volume with one slit-to-slit area regarded as one prism as shown in FIG. 4c.

The processing steps according to the second embodiment is substantially the same as those of the first embodiment, except that the equation used in the step A3 is different. The different equation will be described below, while the entire flowchart of the second embodiment will not be discussed for the sake of brevity.

In the third step A3 as described above, the deviations (deformed slit pattern) of the slits projected onto the article are measured, and the positions of the slits where they are projected onto the article are computed at the plotting points in the X and Y directions according to the equations (2) through (5).

In the first and second embodiments, the slit pattern is projected onto the article Q as it is held at rest on the conveyor A for weight determination. According to a third embodiment, the weight of an article is determined while moving the article. The third embodiment will be described with reference to FIGS. 6 and 7. In the third embodiment, a single slit is employed in place of the slit plate S having a parallel slit pattern.

In FIG. 6, a single slit is projected onto the article, and the article is moved in the direction of the arrow. The irregular surface of the article can be continuously be detected by the manner in which the projected slit is curved as indicated by (1), (2), and (3). By varying the scanning speed of the slit, the computation can be performed at desired accuracy and the processing speed for weight determination can be improved as compared with the arrangement in which the parallel slit pattern is used as shown in FIG. 1b.

Figure 7:
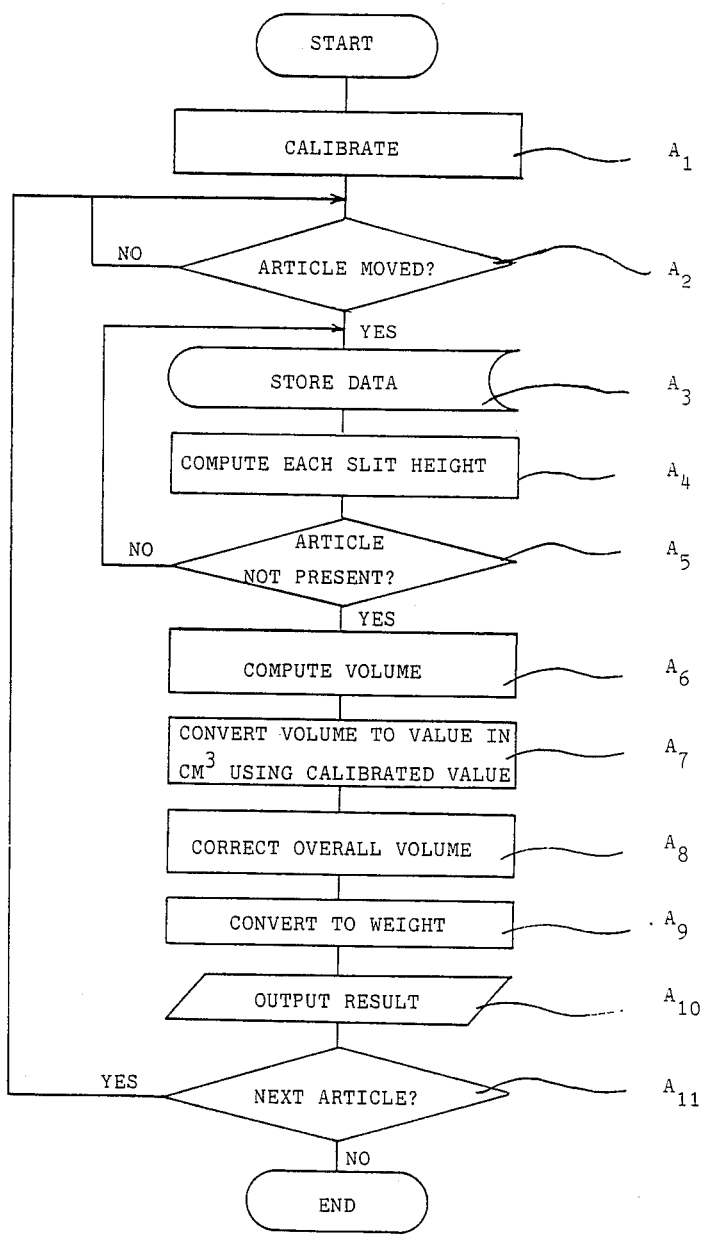
FIG. 7 is a flowchart of still another embodiment of the present invention.

FIG. 7 is a flowchart of the processing steps of the third embodiment. The flowchart of FIG. 7 will be described below.

(1) The image produced by the television camera of the slit pattern projected onto the article is of a size that can be determined only in terms of the pixels. Therefore, the size of the article in the real space is required to be subject to unit calibration. A step A1 effects such unit calibration to find a value in centimeter corresponding to the pixel value. For example, a white sheet of paper having a diameter A cm is imaged by the television camera, and the pixel value corresponding to the image which is A cm across is determined to compute the number of pixels in an area B cm². The result is used for conversion of the article into the unit cm³ in a step A7. (As an example, A=8 cm and B=512 cm³.)

(2) The article is then moved in a step A2, and data on the deviations (deformed slit pattern) of the slits on the surface of the article are stored in a step A3.

(3) Based on the stored data, the heights of the slits on the article are computed in a step A4 according to the equation (1). The steps A3, A4 are repeated until the article is moved out of the zone where the slit pattern is projected, in a step A5.

(4) The surface of the article where the slits are projected is imaged by the television camera to produce an image in terms of pixels. The volume of the upper half of the article is determined as the sum of the heights of the respective pixel positions in a step A6. In other words, the volume is found as the integral of pixel widths.

(5) Since the volume obtained from the image is defined by the pixels, it is then converted into the value in cm³ in the real space in a step A7, using the calibrated values found in the step A1. For example, the volume found in terms of pixels in the step A4 is divided by the number of pixels corresponding to 512 cm³, and the result is multiplied by 512 to get the volume in cm³.

(6) The slit pattern is projected only downwardly onto the article. The shape of the lower half of the article is regarded as being the same as that of the upper half of the article. The overall volume of the article is corrected on the basis of this assumption in a step A8.

(7) The overall volume is multiplied by the apparent specific gravity of the article to find the weight in a step A9.

(8) The determined weight is output to the CRT K and/or the printer J in a step A10.

(9) A step 11 determines whether there is a next article to be processed or not. If there is a next article, then the steps A2 through A10 are repeated.

Third through sixth embodiments for determining whether there is a surface flaw or defect on the article will be described with reference to FIGS. 3, 4a, 6, 8, and 9.

As with the first through third embodiments, the slit pattern is projected onto the article, and imaged by the television camera D. The data of the slit pattern imaged by the television camera D is differentiated at a constant sampling period by a device, described later on. The differential is compared with the differential obtained in the preceding cycle. If the difference between the compared differentials is smaller than a fixed value, then a flaw br is regarded as being not present on the article surface, and if the difference exceeds the fixed value, then a flaw br is regarded as being present on the article surface.

FIG. 3 is illustrative of the third embodiment of the present invention.

When the parallel slit pattern is projected obliquely downwardly onto the article, the projected slit pattern is deformed or deviated into a deformed slit pattern due to an irregular surface of the article. The heights of the slits at positions where they are projected onto the article can be determined on the basis of the slit deviations according to the equation (1). At this time, the deformed slit pattern is differentiated. If the differentials are discrete, then the article is regarded as having a surface flaw.

Figure 8:
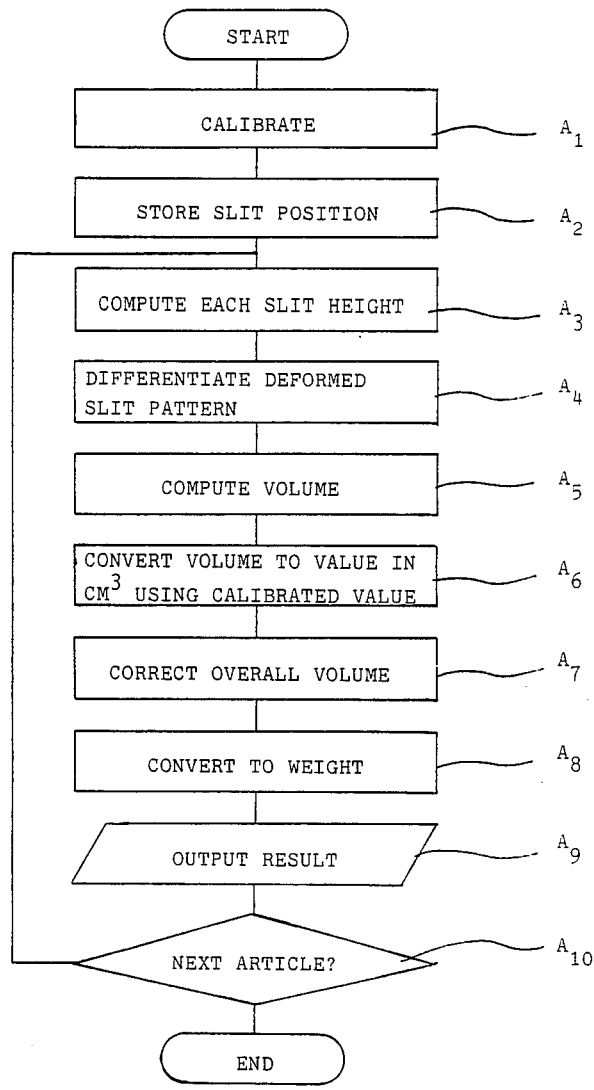
FIG. 8 is a flowchart of a still further embodiment of the present invention.

The flowchart of the processing steps of the fourth embodiment is illustrated in FIG. 8. The flowchart of FIG. 8 is substantially the same as that of FIG. 5 except that a step A4 is added. Therefore, only the added step A4 will be described below.

In the step A4, the data of the deformed slit pattern is differentiated at a constant sampling period to see how the deformed slit pattern is curved. The differential is compared with the differential produced in the preceding cycle. If the difference between the compared differentials is smaller than a fixed value, then a flaw is regarded as being not present on the article surface, and if the difference exceeds the fixed value, then a flaw is regarded as being present on the article surface.

In FIG. 4a which shows the fifth embodiment, there is a flaw br on the surface of the article to make slit pattern data discrete. If the differential difference is in excess of a fixed value, then the article surface is determined as having a harmful flaw. In this embodiment, the slit pattern is differentiated only in the Y direction. However, the slit pattern may be differentiated in the X direction only or in the X and Y directions for flaw detection.

The processing steps of the fifth embodiment are substantially the same as those in the flowchart of FIG. 8 showing the fourth embodiment. However, the step of computing each slit height in the fourth embodiment corresponds to the step A3 of the first embodiment as described above, and the step of computing each slit height in the fifth embodiment corresponds to the step A3 of the second embodiment.

Figure 9:
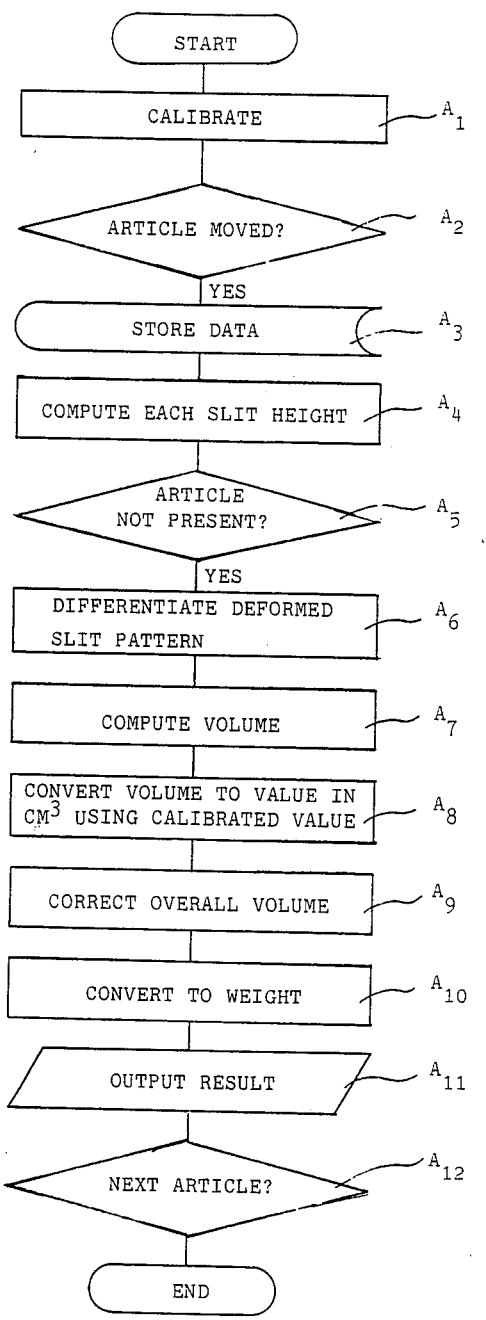
FIG. 9 is a flowchart of a yet still further embodiment of the present invention.

In FIG. 6 which shows the sixth embodiment, there is a flaw br on the surface of the article, and the article is moved while the slit pattern data is differentiated at a fixed sampling period. If the differential difference is below a fixed value, then the article surface is determined as having no flaw, and if the difference is larger than the fixed value, then the article surface is determined as having a flaw. The processing steps of the sixth embodiment are illustrated in the flowchart of FIG. 9 which is different from the flowchart (FIG. 7) of the third embodiment in that a step A6 of differentiating the deformed slit pattern is added. Since the step A6 is the same as the step A4 of FIG. 8, the flowchart of the sixth embodiment will not be described in detail.

Seventh through tenth embodiments for projecting slit patterns obliquely downwardly and upwardly onto the article for weight determination will be described below.

Figure 10:
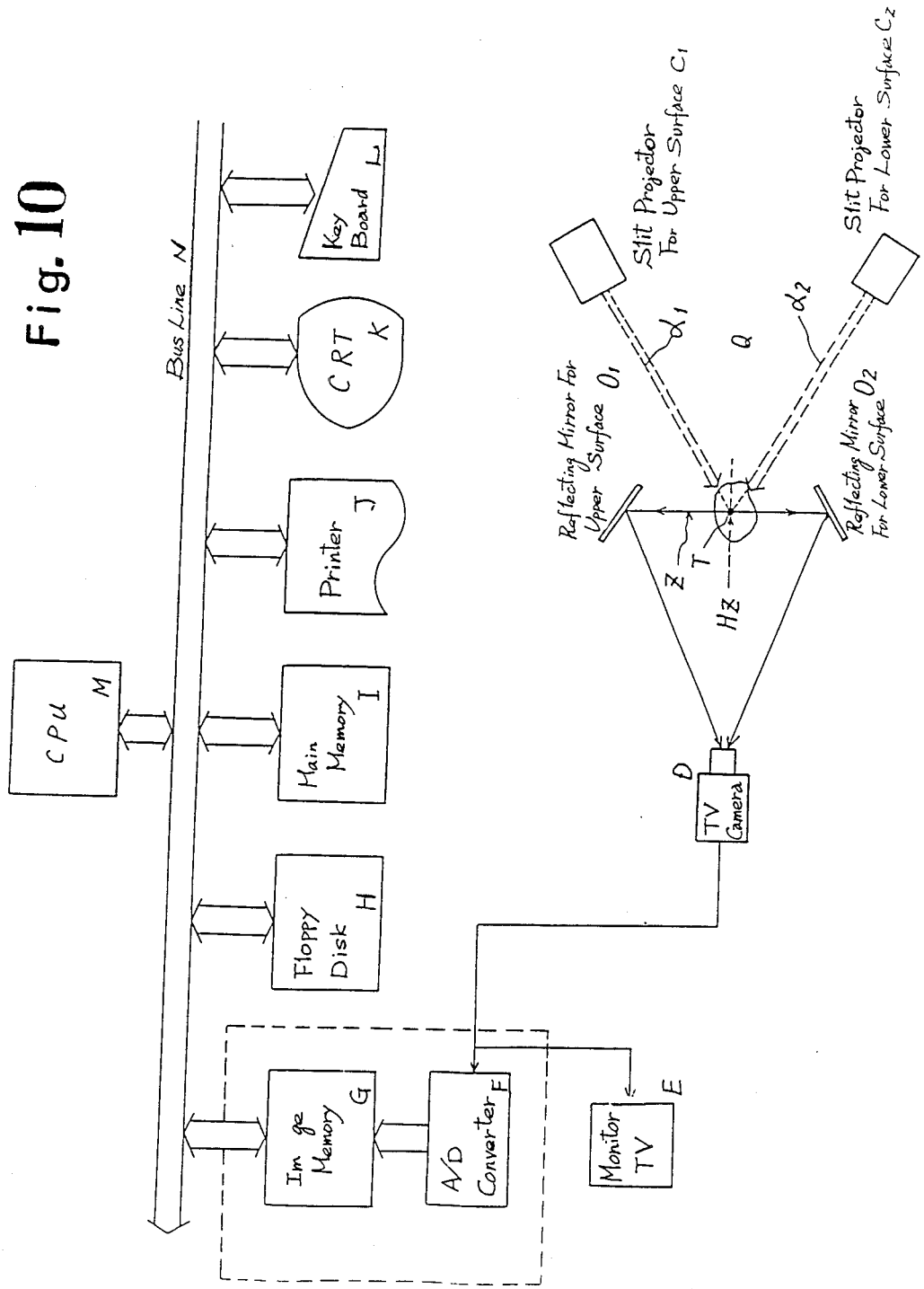
FIG. 10 is a block diagram of another system for carrying out a process of the present invention.

FIG. 10 is a block diagram of a system for measuring the weight of an article according to the process of the seventh through tenth embodiments. The system includes slit projectors $C_1$, $C_2$ for upper and lower surfaces positioned obliquely upwardly and downwardly of the article Q placed on a support table (not shown), and reflecting mirrors $0_1$, $0_2$ for upper and lower surfaces for reflecting slit light projected from the slit projectors $C_1$, $C_2$ and reflected from the upper and lower surfaces of the article Q. The slit light reflected from the reflecting mirrors $0_1$, $0_2$ is detected by a television camera D. The slit projectors $C_1$, $C_2$ have slit pattern projection axes $a_1$, $a_2$, respectively, which intersect with each other at a point T on an optical axis Z extending perpendicularly to the horizontal plane HZ which divides the article Q into two halves. The image picked up by the television camera D is supplied to an A/D converter F and a monitor television receiver E. The A/D converter F converts the image into 256 ×256 8-bit pixels which are then stored in an image memory G. The image memory G is connected by a bus N to a floppy disk H, a main memory I, a printer J, a cathode-ray tube (CRT) K, a key-board L, and a central processing unit (CPU) M. The CPU M executes the cycle of operation indicated by the flowcharts of FIGS. 14 through 17 for determining the weight of the article Q.

Figs. 11a and 11b are illustrative of the seventh embodiment. In FIG. 11a, the slit pattern comprises a parallel slit pattern, and in FIG. 11b, the slit pattern comprises a grid slit pattern. In FIG. 11b, the heights of areas a1 through an defined by vertical and horizontal slits intersecting with each other on the article are determined by correcting vertical slit data with horizontal slit data for determining the volume of the article. Therefore, the process of FIG. 11b can determine the weight of the article more accurately than the process of FIG. 11a. Stated otherwise, in case only vertical slit data is used, the height of one prism defined between two adjacent vertical slits is derived from the data obtained by one plotted point and remains the same. However, with horizontal slit data added, such one prism can be divided to determine different heights thereof based on the vertical and horizontal slit data.

Figure 14:
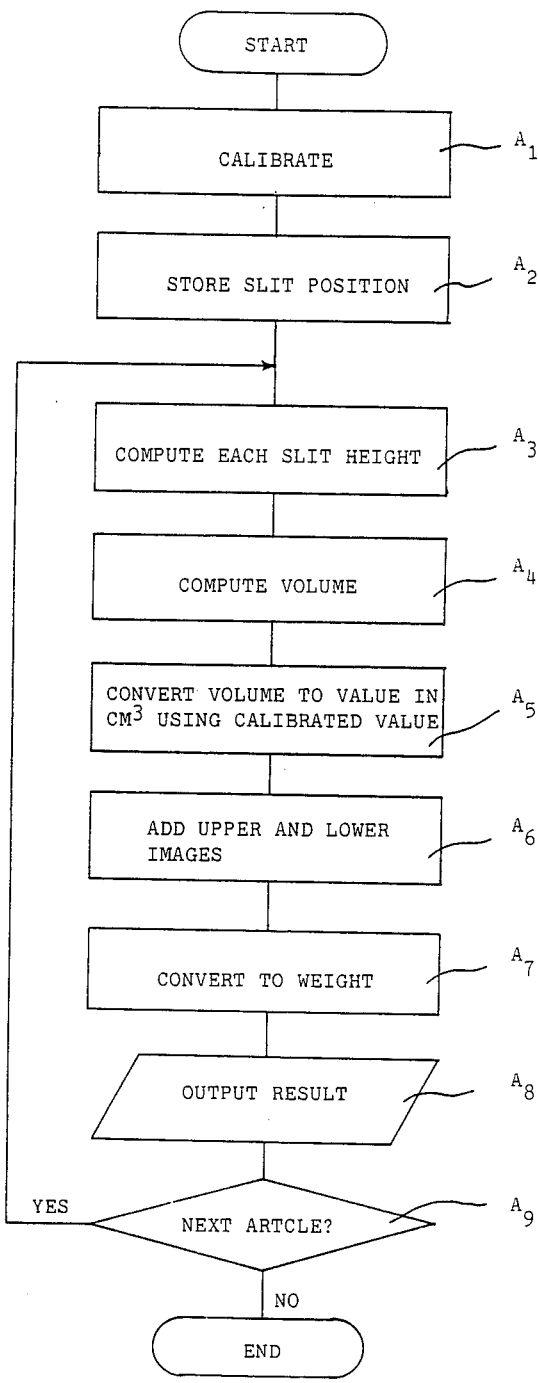
FIGS. 14 through 17 are flowcharts of still other embodiments of the present invention.

FIG. 14 is a flowchart illustrative of the process in which a stripe slit pattern is employed. The flowchart of FIG. 14 will be described below.

(1) The image produced by the television camera of the slit pattern projected onto the article is of a size that can be determined only in terms of the pixels. Therefore, the size of the article in the real space is required to be subject to unit calibration. A step A1 effects such unit calibration to find a value in centimeter corresponding to the pixel value. For example, a white sheet of paper having a diameter A cm is imaged by the television camera, and the pixel value corresponding to the image which is A cm across is determined to compute the number of pixels in an area B $cm^2$. The result is used for conversion of the article into the unit $cm^3$ in a step A5. (As an example, A=8 cm and B=512 $cm^3$.)

(2) The original slit positions are stored as reference points for determining the heights of the slits on the article in a step A2.

(3) The deviations (deformed slit pattern) of the slits projected onto the upper and lower surfaces of the article are measured, and the heights of the slits at positions where they are projected onto the article (the heights from the point T to the upper and lower surfaces) are computed according to the equation (1) in a step A3. The height of the article between two adjacent projected slits is regarded as remaining the same.

(4) The surfaces of the article where the slits are projected are imaged by the television camera to produce images in terms of pixels. The volume of each of the upper and lower halves of the article is determined as the sum of the heights of the respective pixel positions in a step A4. In other words, the volume is found as the integral of pixel widths.

(5) Since the volume obtained from the image is defined by the pixels, it is then converted into the value in $cm^3$ in the real space in a step A5, using the calibrated values found in the step A1. For example, the volume found in terms of pixels in the step A4 is divided by the number of pixels corresponding to 512 $cm^3$, and the result is multiplied by 512 to get the volume in $cm^3$.

(6) The volumes of the article which have been derived from the slit patterns on the upper and lower surfaces of the article are added to obtain the entire volume in a step A6.

(7) The overall volume is multiplied by the apparent specific gravity of the article to find the weight in a step A7.

(8) The determined weight is output to the CRT K and/or the printer J in a step A8.

(9) A step A9 determines whether there is a next article to be processed or not. If there is a next article, then the steps A3 through A8 are repeated.

In the seventh embodiment, the slit pattern data is obtained while the article Q is held at rest. According to the eighth embodiment, the slit pattern data is obtained while the article is in motion.

FIG. 13 shows the eighth embodiment. In this embodiment, two slits are projected obliquely downwardly and upwardly, respectively, onto the article, and the article is moved in the direction of the arrow. The deformed or deviated slit pattern can be detected as indicated by (1), (2), and (3) on the irregular surface of the article. By varying the scanning speed of the slit, the computation can be performed at desired accuracy and the processing speed for weight determination can be improved as compared with the arrangement in which the parallel slit pattern is used as shown in FIG. 11a according to the seventh embodiment.

FIG. 14 is a flowchart of the processing steps of the eighth embodiment. The flowchart of FIG. 14 will be described below.

(1) The image produced by the television camera of the slit pattern projected onto the article is of a size that can be determined only in terms of the pixels. Therefore, the size of the article in the real space is required to be subject to unit calibration. A step A1 effects such unit calibration to find a value in centimeter corresponding to the pixel value. For example, a white sheet of paper having a diameter of A cm is imaged by the television camera, and the pixel value corresponding to the image which is A cm across is determined to compute the number of pixels in an area B $cm^2$. The result is used for conversion of the article into the unit $cm^3$ in a step A7. (As an example, A=8 cm and B=512 $cm^3$.)

(2) The article is then moved in a step A2, and data on the deviations (deformed slit pattern) of the slits on the upper and lower surfaces of the article are stored in a step A3.

(3) Based on the stored data, the heights of the slits on the upper and lower surfaces of the article (the heights from the point T to the upper and lower surfaces) are computed in a step A4 according to the equation (1). The steps A3, A4 are repeated until the article is moved out of the zone where the slit pattern is projected, in a step A5.

(4) The surfaces of the article where the slits are projected are imaged by the television camera to produce images in terms of pixels. The volume of each of the upper and lower halves of the article is determined as the sum of the heights of the respective pixel positions in a step A6. In other words, the volume is found as the integral of pixel widths.

(5) Since the volume obtained from the image is defined by the pixels, it is then converted into the value in $cm^3$ in the real space in a step A7, using the calibrated values found in the step A1. For example, the volume found in terms of pixels in the step A4 is divided by the number of pixels corresponding to 512 $cm^3$, and the result is multiplied by 512 to get the volume in $cm^3$.

(6) The volumes of the article which have been derived from the slit patterns on the upper and lower surfaces of the article are added to obtain the entire volume in a step A8.

(7) The overall volume is multiplied by the apparent specific gravity of the article to find the weight in a step A9.

(8) The determined weight is output to the CRT K and/or the printer J in a step A10.

(9) A step A11 determines whether there is a next article to be processed or not. If there is a next article, then the steps A2 through A10 are repeated.

Ninth and tenth embodiments for determining whether there is a surface flaw or defect on the article will be described below.

As with the fourth through sixth embodiments, the data of the slit pattern imaged by the television camera is differentiated at a constant sampling period. The differential is compared with the differential obtained in the preceding cycle. If the difference between the compared differentials is smaller than a fixed value, then a flaw br is regarded as being not present on the article surface, and if the difference exceeds the fixed value, then a flaw br is regarded as being present on the article surface.

FIGS. 12a and 12b are illustrative of the ninth embodiment of the present invention. In FIG. 12a, the parallel slit pattern is projected onto the article. In this volume determination process, however, the height of each prism is derived from only one plotting point assigned to the prism and hence is subject to a large error.

In FIG. 12b, the grid slit pattern is projected onto the article. The volume of a prism a1 among prisms a1 through an defined by vertical and horizontal slits is computed on the basis of the vertical slit pattern in conseration of the inclination of the upper surface of the prism, which is derived from information arising from the deviation of the horizontal slit pattern. Therefore, the volume and weight of the article can be determined more accurately than the process of FIG. 12a.

Figure 16:
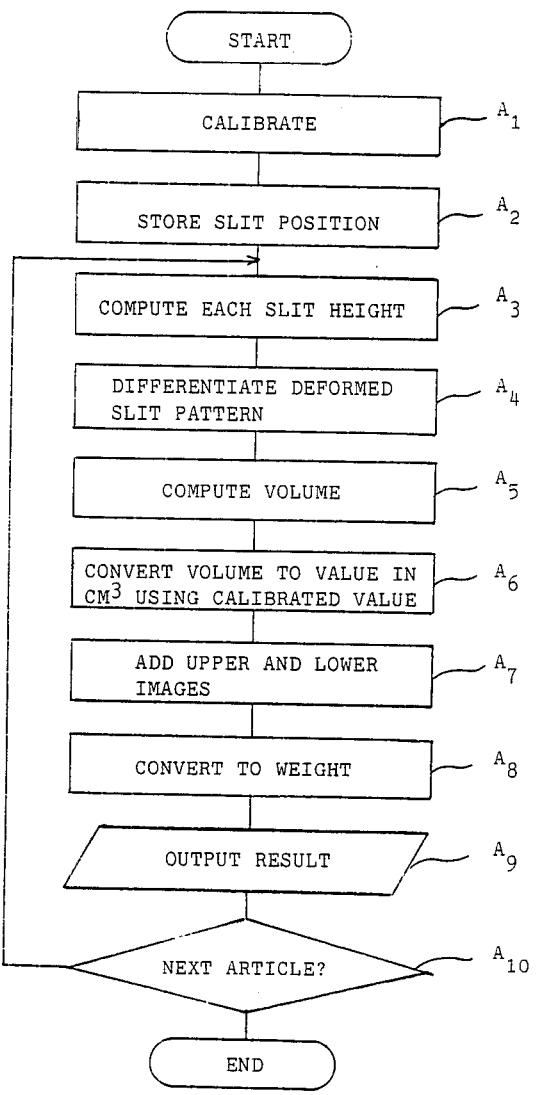

The processing steps of the ninth embodiment are illustrated in the flowchart of FIG. 16 which is different from the flowchart of FIG. 7 in that a step A4 of differentiating the deformed slit pattern is added. Since the step A4 is the same as the step A4 of FIG. 8, the flowchart of the ninth embodiment will not be described in detail.

FIG. 13 is also illustrative of the tenth embodiment of the present invention. In the tenth embodiment, two slits are projected obliquely downwardly and upwardly, respectively, onto the article while the article is moved in the direction of the arrow. The deformed or deviated slit pattern can be detected as indicated by (1), (2), and (3) on the irregular surface of the article. By varying the scanning speed of the slit, the computation can be performed at desired accuracy and the processing speed for volume and weight determination can be improved as compared with the arrangement in which the parallel slit pattern is used as shown in FIG. 12a.

According to the tenth embodiment, the slit pattern data picked up by the television camera from the upper and lower surfaces of the article are differentiated at a constant sampling period. The differential is compared with that in the preceding cycle. If the difference between the compared differentials is smaller than a fixed value, the surfaces of the article are determined as having no flaw.

In FIG. 12b, there is a flaw br on the surface of the article to make the slit pattern data discrete. If the differential difference is in excess of a fixed value, then the surface of the article is determined as having a harmful flaw.

Figure 15:
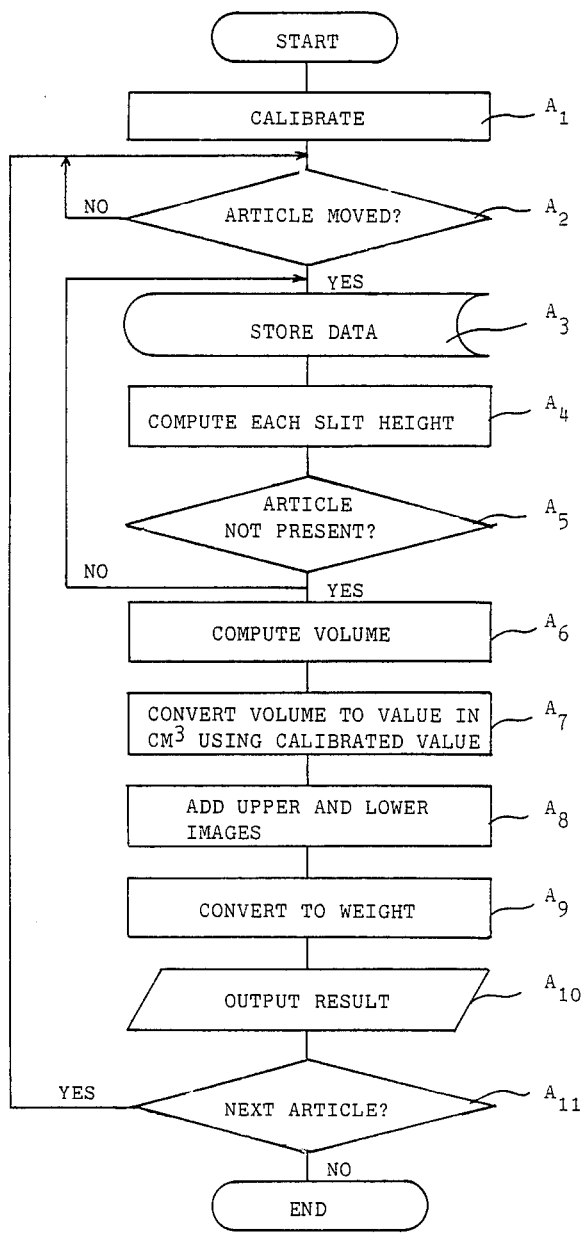
Figure 17:
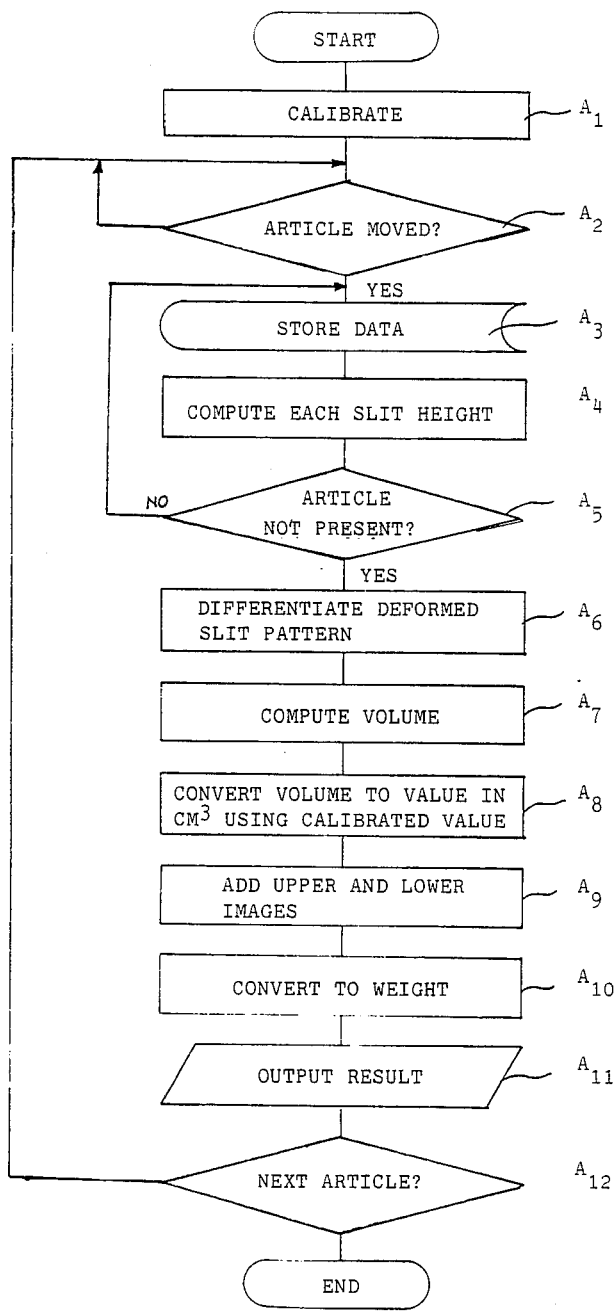

The processing steps of the tenth embodiment are illustrated in the flowchart of FIG. 17 which is different from the flowchart of FIG. 15 in that a step A6 of differentiating the deformed slit pattern is added. Since the step A6 is the same as the step A4 of FIG. 8, the flowchart of the tenth embodiment will not be described in detail.

With the present invention, as described above, slit patterns in the form of parallel stripe patterns or grid patterns are projected obliquely downwardly and upwardly onto an article while it is at rest or in motion, and the heights of slit positions on the article are computed on the basis of the manner in which the slits are curved on the article. The weight of the article is computed on the basis of the slit position heights thus determined. Therefore, the weight of the article can be measured in a non-contact manner without using a weight sensor.

By differentiating the slit patterns projected onto the article, it is determined whether there is a flaw on the surfaces of the article.

Although certain preferred embodiments have been shown and described, it should be understood that many changes and modifications may be made therein without departing from the scope of the appended claims.

What we claim is:

1. A method of determining the volume of an article having an upper surface based on the manner in which a linear pattern projected onto a surface of the article is curved, said method comprising the steps of:

projecting a split pattern obliquely downwardly onto the upper surface of the article;

imaging the upper surface of the article onto which the split pattern is projected with a television camera;

automatically computing the heights of slit positions on the article based on the image picked up by the television camera; and automatically estimating the volume of the article based on the computed heights of the slit positions.

2. A method according to claim 1, further comprising the step of automatically multiplying the volume of the article by the apparent specific gravity thereof to find an article weight.

3. A method according to claim 1, wherein said slit pattern is in the form of a parallel stripe pattern.

4. A method according to claim 1, wherein said slit pattern is in the form of a grid pattern.

5. A method according to claim 1, further comprising the steps of finding the differentials of the slit pattern projected onto the article, and determining whether the differentials are discrete to determine whether there is a flaw on the surface of the article.

6. A method according to claim 1, wherein the slit pattern is projected onto the article while the article is being moved.

7. A method of determining the volume of an article having upper and lower surfaces based on the manner in which a linear pattern projected onto a surface of the article is curved, said method comprising the steps of:

projecting slit patterns obliquely downwardly and upwardly onto the upper and lower surfaces of the article; onto which the slit patterns are projected with a television camera through reflecting mirrors disposed upwardly and downwardly of the article;

automatically computing the heights of slit positions on the article based on the images picked up by the television camera; and automatically estimating the volume of the article based on the computed heights of the slit positions.

8. A method according to claim 7, further comprising the step of automatically multiplying the volume of the article by the apparent specific gravity thereof to find an article weight.

9. A method according to claim 7, wherein each of said slit patterns is in the form of a parallel stripe pattern.

10. A method according to claim 7, wherein each of said slit patterns is in the form of a grid pattern.

11. A method according to claim 7, further comprising the steps of finding the differentials of the slit patterns projected onto the article, and determining whether the differentials are discrete to determine whether there is a flaw on the surfaces of the article.

12. A method according to claim 7, wherein the slit patterns are projected onto the article while the article is being moved.

* * * * *

UNITED STATES PATENT AND TRADEMARK OFFICE
CERTIFICATE OF CORRECTION

PATENT NO. : 4,767,212

DATED : August 30, 1988

INVENTOR(S) : Kitahashi et al.

It is certified that error appears in the above-identified patent and that said Letters Patent is hereby corrected as shown below:

Front page [57] ABSTRACT, line 6, "surface" (second occurrence) should be --surfaces--.

Col. 1, line 6, "Ser. No. Sept. 19, 1985 now" should be --Ser. No. 777,732 filed on Sept. 19, 1985, now--;

line 15, "vegita-" should be --vegeta- --;
line 18, "noncontact" should be --non-contact--.

Co. 3, line 15, "d" should be --$\underline{d}$--;
line 17, "d" should be --$\underline{d}$--;
line 18, "h" should be --$\underline{h}$--;
line 22, "(#" should be --($\pi$--;
line 61, "centimeter" should be --centimeters--.

Col. 4, line 55, "(#" should be --($\pi$--.

UNITED STATES PATENT AND TRADEMARK OFFICE
CERTIFICATE OF CORRECTION

PATENT NO. : 4,767,212

DATED : August 30, 1988

INVENTOR(S) : Kitahashi et al.

It is certified that error appears in the above-identified patent and that said Letters Patent is hereby corrected as shown below:

Col. 5, line 4, Equation (3), "(#" should be --($\pi$--;
line 6, Equation (4), "(#" should be --($\pi$--;
line 8, Equation (5), "(#" should be --($\pi$--;
line 34, "article The" should be --article. The--.

Col. 7, line 53, "a$_1$, a$_2$" should be --$\alpha_1$, $\alpha_2$,--.

Col. 12, Claim 7, line 17, after "article;", continue with a NEW paragraph, and insert --imaging the upper and lower surfaces of the article--.

Signed and Sealed this

Twenty-fourth Day of January, 1989

Attest:

DONALD J. QUIGG

Attesting Officer    Commissioner of Patents and Trademarks